United States Patent
Moutin

(10) Patent No.: US 7,369,614 B2
(45) Date of Patent: May 6, 2008

(54) MPEG DECODER OF IMAGES FROM MULTIPLE SEQUENCES

(75) Inventor: Jean-Michel Moutin, Echirolles (FR)

(73) Assignee: STMicroelectronics S.A., Gentilly (FR)

( * ) Notice: Subject to any disclaimer, the term of this patent is extended or adjusted under 35 U.S.C. 154(b) by 694 days.

(21) Appl. No.: 09/770,112

(22) Filed: Jan. 24, 2001

(65) Prior Publication Data

US 2001/0026592 A1    Oct. 4, 2001

(30) Foreign Application Priority Data

Jan. 25, 2000   (FR)   ..................................  00 00933

(51) Int. Cl.
*H04N 7/12*   (2006.01)
(52) U.S. Cl. ............ 375/240.28; 375/240; 375/240.01; 375/240.12; 375/240.25
(58) Field of Classification Search ........... 375/240.28, 375/240, 240.01, 240.12, 240.15, 240.27, 375/240.26, 240.24, 240.25; 348/452
See application file for complete search history.

(56) References Cited

U.S. PATENT DOCUMENTS

| | | | | |
|---|---|---|---|---|
| 5,455,629 A | * | 10/1995 | Sun et al. | 375/240.27 |
| 5,532,751 A | * | 7/1996 | Lui | 348/452 |
| 5,880,786 A | * | 3/1999 | Oku et al. | 375/240.15 |
| 6,477,204 B1 | * | 11/2002 | Fukushima et al. | 375/240.28 |

FOREIGN PATENT DOCUMENTS

| | | |
|---|---|---|
| EP | 0 881 835 A2 | 12/1998 |
| EP | 0 893 917 A2 | 1/1999 |

* cited by examiner

*Primary Examiner*—Allen Wong
(74) *Attorney, Agent, or Firm*—Lisa K. Jorgenson; Timothy L. Boller; Seed IP Law Group PLLC

(57) ABSTRACT

A circuit for controlling an MPEG decoder rated by a signal of given period likely to decode several coded images, receiving at each period beginning an order to decode several images of a first or of a second type, the images of the second type being decodable at any instant of the period following their decoding order, and the images of the first type being decodable at any instant of the two periods following their decoding order, including a priority assignment circuit for, at each period, granting among these images the decoding priority, if there are any, to the images of the first type that still have not been decoded one period after their decoding order and otherwise, if there are any, to the images of the second type.

21 Claims, 4 Drawing Sheets

MPEG DECODER OF IMAGES FROM MULTIPLE SEQUENCES

TECHNICAL FIELD

The present invention relates to circuits for decoding images coded according to standard MPEG, and more specifically to a circuit for controlling an MPEG decoder likely to decode a plurality of images in a reduced time, for example one vertical scanning period of a television screen, to visualize several television channels at the same time.

BACKGROUND OF THE INVENTION

Coding standard MPEG enables storing the images of a digital image sequence in a reduced memory space, or transmitting these images in a channel of reduced flow. A coded image must be decoded before being able to be displayed, for example on a television screen.

FIG. 1 schematically shows in the form of blocks the main elements of a device 2 for decoding and displaying digital image sequences coded according to standard MPEG. This device includes a decoder (DECOD) 4 connected via a bus 6 to a memory (MEM) 8 in which the coded images to be decoded are stored. The images decoded by the decoder are temporarily stored in memory 8, before being provided to a screen (SCRN) 10 connected to bus 6 via a display control and management device (DIS) 12. The decoder and the display controller are controlled by a circuit such as a microprocessor ($\mu$P) 14 connected via a bus 7 to provide and receive control signals and data. Microprocessor 14 especially provides the decoder with orders for decoding the coded images stored in memory 8. Conventionally, to order the decoding of coded image stored in an area of memory 8, microprocessor 14 provides decoder 4 with the address of the beginning of this area, and with the image decoding order starting from a given time. The operation of such a circuit is well known by those skilled in the art and it will not be detailed any further.

Existing analog television systems conventionally provide displaying several images on screen upon a same screen scanning. This for example enables displaying one or several images incrusted in a main image and simultaneously visualizing several television channels. There is a need for a device for decoding images coded according to standard MPEG enabling such a simultaneous display, that is, enabling decoding of a plurality of images within a period of vertical scanning of a television screen.

The device of FIG. 1 enables decoding and displaying the images of a single image sequence. Thus, a solution consists of duplicating this device as many times as simultaneously decoded and displayed images are desired.

It is conventional in a television system to divide an image in two interlaced frames and to display each of the two frames upon two successive vertical screen scannings. According to standard MPEG, an image can be coded in three different ways: either in the form of a complete image including the two interlaced frames ("frame" image), or in the form of two half-images, each of which corresponds to one of the frames ("field" images), or else in the form of a non-interlaced complete image ("progressive" image). The following description only relates to interlaced images of both types, since progressive images can, in a known manner, be processed in the same way as the interlaced half-images. A same image sequence may be formed of images corresponding to both coding types. The different image sequences that are desired to be decoded and simultaneously displayed may also have different codings. The decoding of each type of coded image corresponds to a specific operation of decoder 4.

FIG. 2A illustrates the decoding of a sequence of two images $I_1$ and $I_4$, each coded in the form of two half-images $I_{1T}$ and $I_{1B}$, and $I_{4T}$ and $I_{4B}$ respectively. The frame contained in each decoded half-image must be displayed in a period $T_{VSYNC}$, and a half-image can thus be decoded in a period $T_{VSYNC}$. Decoder 4 receives from microprocessor 14 the order to decode half-images $I_{1T}$, $I_{1B}$, $I_{4T}$, $I_{4B}$, respectively at times $t_{100}$, $t_{200}$, $t_{300}$ and $t_{400}$, each distant by a period $T_{VSYNC}$. The respective decodings of half-images $I_{1T}$, $I_{1B}$, $I_{4T}$, $I_{4B}$ occur in the period $T_{VSYNC}$ immediately following the decoding order. It should be noted that, to ensure a proper operation of the decoding and display device, it is desirable for the decoding of a half-image to be no longer than a maximum duration equal to one period $T_{VSYNC}$ and not to continue in the following period.

FIG. 2B illustrates the decoding of a sequence of two images $I_2$ and $I_5$ coded in the form of complete images. The two frames included in a complete decoded images must be displayed during two consecutive periods $T_{VSYNC}$, and a complete image can be decoded in two periods $T_{VSYNC}$. Decoder 4 receives from microprocessor 14 the order to decode complete images $I_2$ and $I_5$ respectively at times $t_{100}$ and $t_{300}$. The respective decodings of images $I_2$ and $I_5$ occur during the two successive periods $T_{VSYNC}$ that immediately follow the decoding order. In this case also, to ensure a proper operation, it is desirable for the decoding not to be continued after the end of the maximum duration, here of two periods, which is assigned thereto. It should be noted that memory 8 is a buffer that only contains a few images of a sequence, which are written and read in phase with the reception of the sequence by the decoding and display device. When several image sequences coming from different sources are considered, it is possible for these sequences not to be in phase, in terms of periods $T_{VSYNC}$, and for them to have to be decoded and displayed with this phase shift. Especially, two image sequences coded in the form of complete images may be shifted by one screen scanning period $T_{VSYNC}$.

FIG. 2C illustrates the decoding of a sequence formed of two images $I_3$ and $I_6$ coded in the form of complete images, the decoding order of which is given to decoder 4 with a phase shift of one period $T_{VSYNC}$ with respect to the sequence of FIG. 2B. The order to decode images $I_3$ and $I_6$ is given to the decoder at times $t_{200}$ and $t_{400}$, and their respective decodings occur during the two successive periods $T_{VSYNC}$ that immediately follow the decoding order.

Considering a circuit enabling simultaneous decoding and display of three image sequences such as those of the preceding drawings, which uses three distinct devices such as that in FIG. 1, each of these devices can decode with its own phase the image sequence provided thereto. Such a circuit operates satisfactorily, but has several disadvantages. In particular, it uses three MPEG decoders, which are large, bulky and expensive circuits.

SUMMARY OF THE INVENTION

An embodiment of the present invention provides a device, which only includes a single decoding circuit, for decoding several images.

The device includes a specific control circuit to manage the decoding of images from several sequences, of different types of coding and phase, by means of a single decoder.

In particular, the control circuit controls an MPEG decoder rated by a signal of given period likely to decode several coded images, receiving at each period beginning an order to decode several images of a first or of a second type, the images of the second type being decodable at any instant of the period following their decoding order, and the images of the first type being decodable at any instant of the two periods following their decoding order, including a priority assignment circuit for, at each period, granting among these images the decoding priority, if there are any, to the images of the first type that still have not been decoded one period after their decoding order and otherwise, if there are any, to the images of the second type.

According to an embodiment of the present invention, the control circuit further includes a pointer memory for storing the beginning addresses of each of the images to be displayed.

According to an embodiment of the present invention, the control circuit further includes a safety circuit for adding a predetermined header before each image provided to the decoder so that two images put end to end cannot form a code that causes a malfunction of the decoder.

An embodiment of the present invention includes an integrated control decoding circuit including an MPEG decoder connected to such a control circuit.

Another embodiment of the present invention includes a circuit for decoding and displaying images coded according to standard MPEG, including such an integrated control decoding circuit connected to read coded data from and to write decoded data into a memory via a first bus, a display control circuit connected between a screen and the first bus, and a microprocessor connected to a second bus, to control the integrated control decoding circuit and the display control circuit.

According to an embodiment of the present invention, the images of the first type are interlaced complete images, and the images of the second type are interlaced half-images.

According to an embodiment of the present invention, the images of the first type are interlaced complete images, and the images of the second type are interlaced half-images or non-interlaced complete images.

The foregoing features and advantages of the present invention will be discussed in detail in the following non-limiting description of specific embodiments in connection with the accompanying drawings.

DETAILED DESCRIPTION OF THE INVENTION

Same references designate same elements in the different drawings. For clarity, only those elements useful to the understanding of the present invention have been shown.

Figure 1:
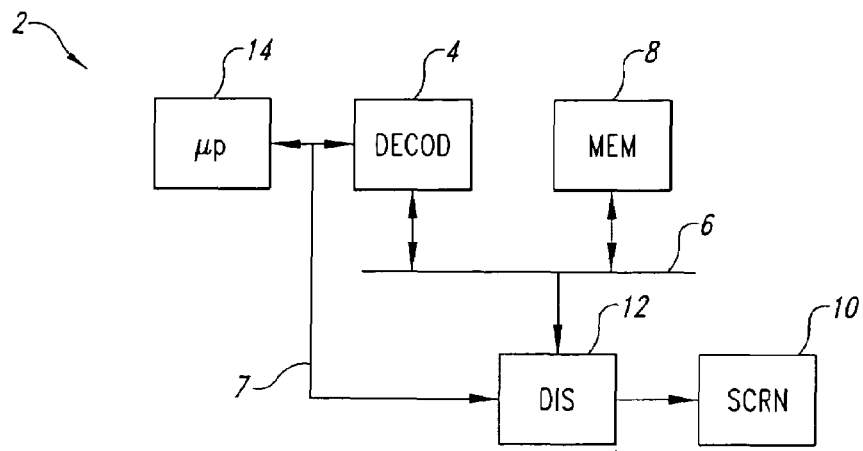
FIG. 1, previously described, shows in the form of blocks a device according to prior art for decoding and displaying a sequence of images coded according to standard MPEG.
Figure 2A:
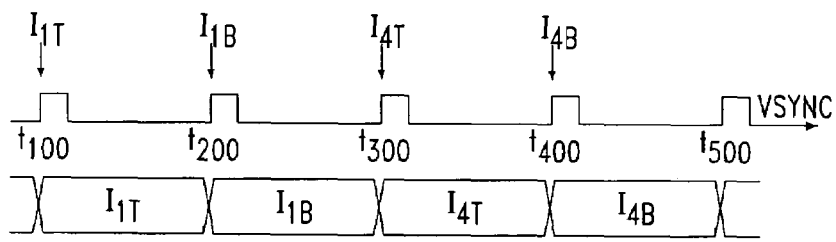
FIGS. 2A, 2B, 2C, previously described, illustrate the decoding according to prior art of three image sequences having different types of coding and phase.
Figure 2B:
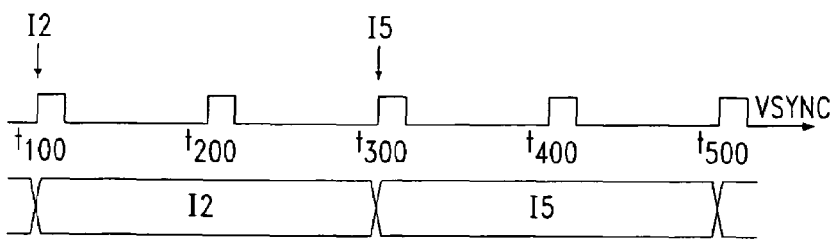
Figure 2C:
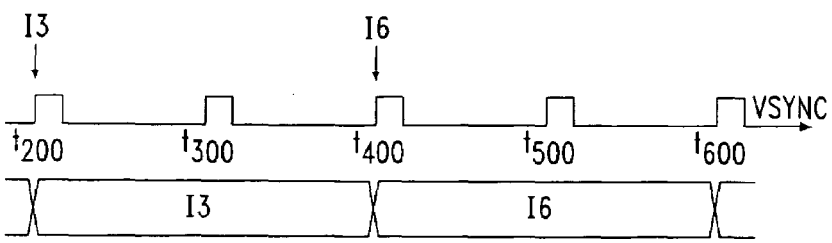
Figure 3:
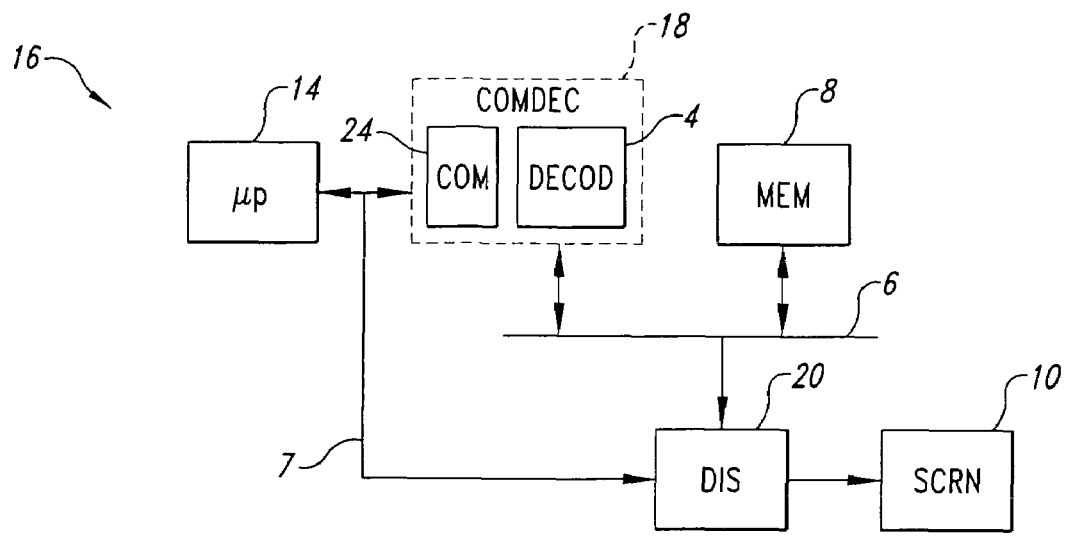
FIG. 3 illustrates, in the form of blocks, an embodiment of a decoding and display device according to the present invention.

FIG. 3 shows in the form of blocks a decoding and display device 16 according to the present invention, which enables processing the images of several distinct sequences, for example three, in one screen scanning period. Device 16 includes an integrated control decoding circuit (COMDEC) 18 connected to read the coded data of three sequences and to write the decoded data into a memory 8 via a bus 6. A display control circuit (DIS) 20 has its output connected to a screen 10. The input of circuit 20 is connected to bus 6 to read from memory 8 the decoded images of the three sequences and to transmit them to screen 10. It should be noted that display control circuit 20 is more complex than circuit 12 of FIG. 1 and that it is in particular able to have access in the memory to the data of several images and to display them adequately on screen. As in FIG. 1, the general device is driven by a microprocessor 14 via a bus 7. Integrated control decoding circuit 18 includes a decoding circuit 4 identical to the decoder of FIG. 1, and a circuit (COM) 24 for controlling the decoder circuit. It should be noted that, for the device according to the present invention to operate, decoder 4 must operate at a rate at least three times greater than the rate described in relation with FIGS. 2A to 2C, that is, it must be able to decode in two periods $T_{VSYNC}$ three complete images or six half-images, or any equivalent combination. This condition is fulfilled by most decoders according to the state of the art, and it is not limiting in practice. The order in which the images are decoded during these two periods is particularly important and control circuit 24 has the function of determining which images are to be decoded in priority. Control circuit 24 also has the function of ensuring the compatibility of the data provided to decoder 4 with the MPEG syntax.

Figure 4:
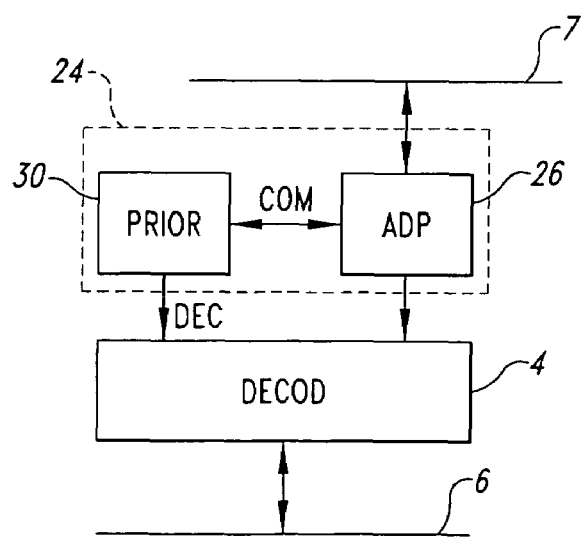
FIG. 4 shows, in the form of blocks, an embodiment of the control circuit of FIG. 3.

FIG. 4 shows in the form of blocks an embodiment of control circuit 24 according to the present invention. Circuit 24 includes an address pointer memory (ADP) 26, for example formed of registers, connected to bus 7 to receive from microprocessor 14 the beginning addresses (or pointers) of the areas of memory 8 in which the images to be decoded and the decoding parameters of these images are stored. The decoding parameters are especially used to identify the type of the images to be decoded. There are as many sets of parameters and of memory pointers as there are sequences to be decoded in parallel. Memory 26 is connected to decoder 4 to provide it with the addresses (or pointers) which the decoder must have to access memory 8, via bus 6, to perform its task. Finally, control circuit 24 includes a priority assignment circuit 30 connected to memory 26 to receive the decoding parameters associated with each image to be decoded. Circuit 30 is further connected to decoder 4 in order to enable the decoder to read from memory 8 images designated by the pointers of registers 26 with a priority order which will be described, and to control decoding circuit 4 so that it decodes the images provided by memory 8. It should be noted that once the decoding parameters have been taken into account by the control circuit, the content of the registers of block 26 can be renewed by a following image.

The operation of circuits 4 and 24 is synchronized on vertical scanning period $T_{VSYNC}$, and a new decoding order can be given by microprocessor 14 for each period. For each new period $T_{VSYNC}$, circuit 30 calculates a new priority order for the image decoding, the pointer and identification parameters of which have just been written into memory 26. According to the type of coding of the images having their pointer in memory 26, and also to the time from which each pointer is present therein, priority management circuit 30 assigns a priority to each pointer, after which it orders decoder 4 to decode the images designated by the pointers having the highest priority. According to the present invention, the highest decoding priority is granted to the complete images having had their pointer present in memory 26 for a duration longer than one period $T_{VSYNC}$, that is, complete images with a decoding order older than more than one period $T_{VSYNC}$. A lower decoding priority is granted to the half-images, and the lowest decoding priority is granted to the complete images having had their pointer present in memory 26 for less than one period $T_{VSYNC}$. This operation is illustrated in FIGS. 5 and 6.

Figure 5:
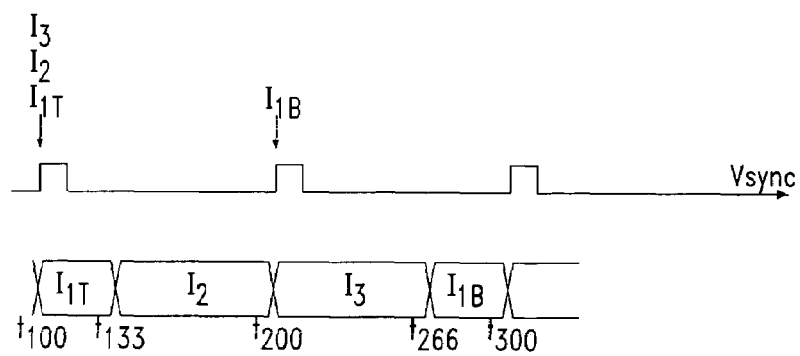
FIGS. 5 and 6 illustrate the operation of the circuit of FIG. 3.

FIG. 5 illustrates the decoding of two half-images $I_{1T}$, $I_{1B}$, the decoding order of which is given at times $t_{100}$ and $t_{200}$, and of two complete images $I_2$ and $I_3$, the decoding order of which is given at time $t_{100}$. The pointers and parameters of images $I_{1T}$, $I_2$ and $I_3$ are written into memory 26 before time $t_{100}$, and the pointer of image $I_{1B}$ is written before time $t_{200}$. Priority management circuit 30 grants the highest decoding priority to half-image $I_{1T}$, and a low decoding priority level to images $I_2$ and $I_3$. Half-image $I_{1T}$ is decoded in priority, between time $t_{100}$ and a time $t_{133}$ located at one third of interval $t_{100}$-$t_{200}$, after which one of the two images $I_2$, $I_3$, for example image $I_2$, is decoded between time $t_{133}$ and time $t_{200}$. At time $t_{200}$, memory 26 thus contains the pointers of half-image $I_{1B}$ and of complete image $I_3$. The pointer of image $I_3$ has been in memory 26 for more than one period $T_{VSYNC}$, and circuit 30 assigns it with the highest decoding priority. Half-image $I_{1B}$ receives the lowest priority. Image $I_3$ is decoded between time $t_{200}$ and a time $t_{266}$ located at the two thirds of interval $t_{200}$-$t_{300}$. Half-image $I_{1B}$ is decoded between time $t_{266}$ and time $t_{300}$. It should be noted that the device 16 also enables decoding within two periods $T_{VSYNC}$: two images coded in the form of half-images and one complete image, only images coded in the form of half-images, or only images coded in the form of complete images. Other more complex decoding combinations may also be processed by the device.

Figure 6:
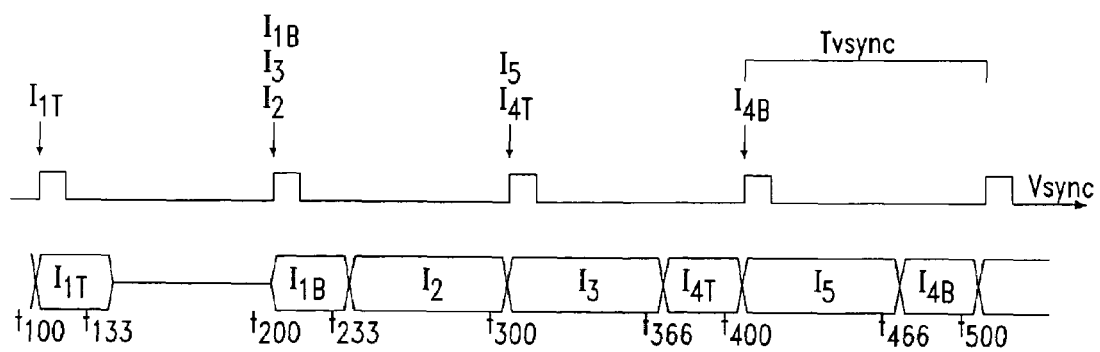

FIG. 6 illustrates a complex decoding combination in which the decoding order of two half-images $I_{1T}$ and $I_{1B}$ is given at times $t_{100}$ and $t_{200}$, the decoding order of two complete images $I_2$ and $I_3$ is given at time $t_{200}$, the decoding order of two half-images $I_{4T}$ and $I_{4B}$ is given at times $t_{300}$ and $t_{400}$, and the decoding order of a complete image $I_5$ is given at time $t_{300}$. At time $t_{100}$, memory 26 only contains the pointer of half-image $I_{1T}$, which is decoded between time $t_{100}$ and time $t_{133}$. At time $t_{200}$, memory 26 contains the pointers of half-image $I_{1B}$ and of complete images $I_2$ and $I_3$. The priority management circuit assigns the highest decoding priority to half-image $I_{1B}$, which is decoded between times $t_{200}$ and T233. Both complete images $I_2$ and $I_3$ then have a low decoding priority and one of them, for example, image $I_2$, is decoded between times t233 and $t_{300}$. At time $t_{300}$, memory 26 contains the pointers of half-image $I_{4T}$ and of complete images $I_3$ and $I_5$. The pointer of complete image $I_3$ having been in memory 26 for more than one period $T_{VSYNC}$, the priority management circuit grants the highest decoding priority to complete image $I_3$. A lower decoding priority is granted to half-image $I_{4T}$, and the lowest decoding priority is granted to complete image $I_5$. Complete image $I_3$ is decoded between time $t_{300}$ and a time $t_{366}$, located at two thirds of interval $t_{300}$-$t_{400}$, and half-image $I_{4T}$ is decoded between time $t_{366}$ and time $t_{400}$. At time $t_{400}$, memory 26 contains the pointers of complete image $I_5$ and of half-image $I_{4B}$, and the decoding priority is granted to complete image $I_5$. Image $I_5$ is decoded between time $t_{400}$ and a time t466, and half-image $I_{4B}$ is decoded between time t466 and time $t_{500}$.

It should be noted that the priority management according to the present invention enables always decoding a half-image within the period $T_{VSYNC}$ following its decoding order, and always decoding a complete image within the two periods $T_{VSYNC}$ following its decoding order.

In the device 16, decoder 4 consecutively receives the image data to be decoded from different image sequences, read from memory 8. It has been seen previously that decoder 4 is a conventional MPEG decoder. In such a decoder, the structure of which will not be detailed herein, the decoding of an image ends when the decoder detects a code (PSC) marking the beginning of the next image. This code is defined by standard MPEG. Thus, decoder 4 reads from memory 8 the image that it decodes until it detects the PSC code of the next image stored in memory 8. Such an image, conventionally the next image in the sequence to which the decoded image belongs, is different from the next image to be decoded, the pointer of which is located in memory 26. Now, a conventional MPEG decoder includes an internal buffer area in which are permanently contained part of the data of the decoded image. Upon detection of the PSC code indicating the end of the decoding of an image, this memory area includes the last data of the decoded image as well as parasitic data corresponding to the PSC code and to the first data of the next image in the sequence. This memory area cannot be reset, whereby decoder 4 receives these parasitic data before receiving the data of the next image to be decoded. These data start with a PSC code that triggers the next decoding.

The putting end to end of the parasitic data and of the PSC code of the next image to be decoded is likely to take the form of a PSC code. For example, if the PSC codes correspond to a specific sequence of eight bytes respectively having values 00, 00, 00, 00, 00, 01, 00, and 00, and if the parasitic data end with six bytes respectively having values 00, 00, 00, 00, 00, and 01, the putting end to end of the parasitic data and of the PSC code of the next image will be byte sequence 00 00 00 00 00 01 00 00 00 00 00 01 00 00 and the decoder will identify the first eight bytes of this expression as being a PSC code. In such a case, the decoding of the next image will start too soon and the decoder will enter an erroneous operating mode. The present invention provides interposing, between the end of the parasitic data and the PSC code of the next image to be decoded, a safety header suppressing any risk of erroneous generation of a PSC code by the putting end to end of the parasitic data and of the next PSC code. The safety header may be formed of a coded byte at value FF. In the preceding example, the putting end to end of the parasitic data, of the safety header, and of the PSC code is a byte sequence 00 00 00 00 00 01 FF 00 00 00 00 00 01 00 00 that presents no risk of erroneous identification of the PSC code.

Figure 7:
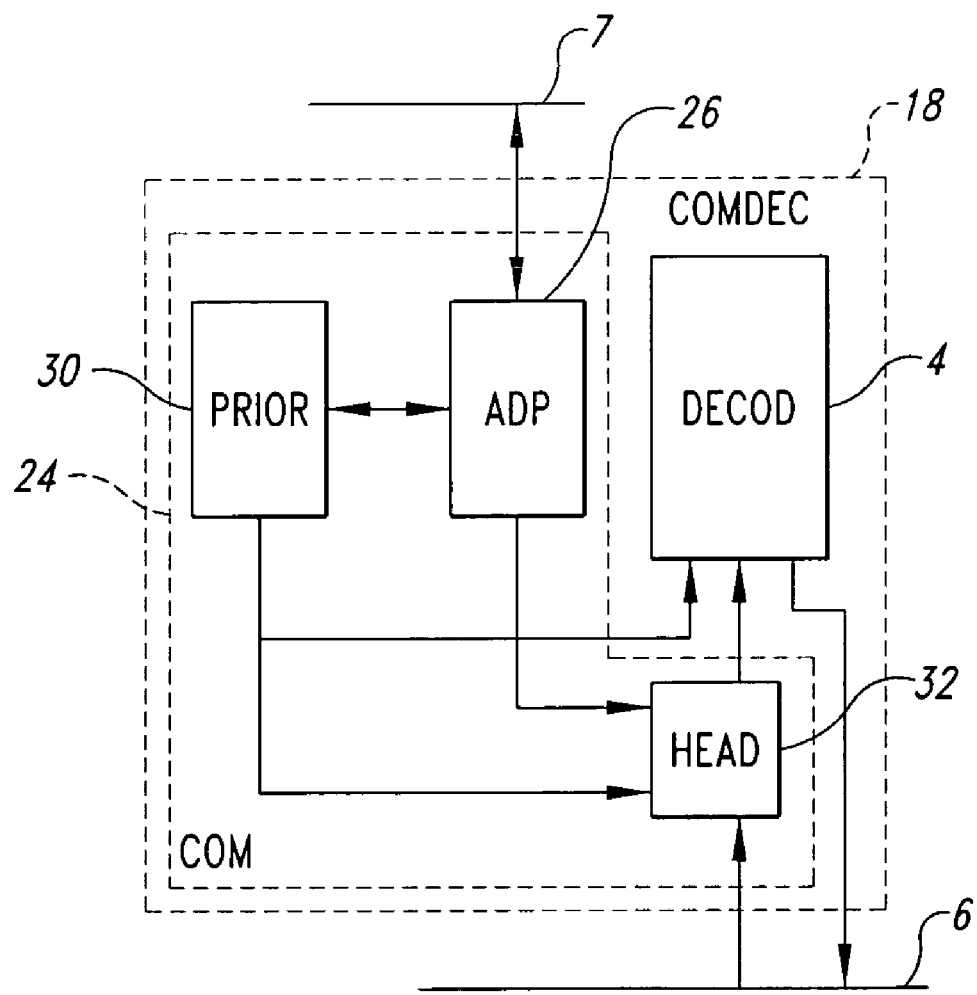
FIG. 7 shows, in the form of blocks, an embodiment of the integrated control decoding circuit of FIG. 3.

FIG. 7 shows in the form of blocks a circuit 18 such as described in FIG. 4, including a decoder 4 and a control circuit 24, further provided with a circuit 32 intended for inserting a safety header and for accessing the image data instead of decoder 4, according to the addresses provided by memory 26. Circuit 32 is connected between bus 6 and decoder 4. It is further connected to a decoding control output provided by circuit 30, to insert the header before the data provided to decoder 4 from bus 6 at the beginning of each decoding.

Of course, the present invention is likely to have various alterations, modifications, and improvements which will readily occur to those skilled in the art. In particular, those skilled in the art will easily adapt the present invention to a priority management circuit that grants the highest priority to the half-images, then to the complete images, the beginning address of which has been contained in memory 26 for more than one period $T_{VSYNC}$, then to the complete images, the beginning address of which has been contained in memory 26 for less than one period $T_{VSYNC}$. On the other hand, the case of a device enabling decoding and display of the images belonging to three different image sequences has been described, but those skilled in the art will easily adapt the present invention to a device enabling decoding and display of the images from two image sequences, from four image sequences, or more. Cases in which each sequence includes images of a same type have only been described, but those skilled in the art will easily adapt the present invention to the case in which the sequences include images of different types. Finally, only the case in which all images have the same size and can be decoded within a same duration has been considered in the foregoing description. However, those skilled in the art will easily adapt the present invention to a case in which the images of the different sequences have different respective sizes (for example high and low resolutions), and where the decoding durations of the images from each sequence are different.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A device comprising:
   an MPEG decoder structured to decode several coded images from at least a first and a second MPEG stream for displaying simultaneously one image of the first MPEG stream and one image of the second MPEG stream, the coded images belonging to a first type or to a second type, the images of the first type being frame interlaced images comprising two fields, the decoding of which is completed in two periods, one of the periods being equal to the time duration of one field display, and the images of the second type being interlaced half-images or progressive images, the decoding of which is completed in one of the periods; and
   a decoder control circuit for controlling the MPEG decoder, the decoder control circuit being configured to receive an order to decode a plurality of images at each of the periods and including a priority assignment circuit structured to, at each period, grant among the images to be decoded a decoding priority such that the highest decoding priority is granted to images of the first type that have received their decoding order for more than one of the periods, a lower decoding priority is granted to images of the second type, and the lowest decoding priority is granted to images of the first type that have received their decoding order for less than one of the periods.

2. The device according to claim 1, wherein the decoder control circuit further includes a pointer memory for storing the beginning addresses of each of the images to be displayed.

3. The device according to claim 1, wherein said decoder control circuit further includes a safety circuit for adding a predetermined header before each image provided to the decoder so that two images put end to end cannot form a code that causes a malfunction of the decoder.

4. The device according to claim 1, further comprising:
   a memory that stores coded data and decoded data;
   a first bus that connects the decoder control circuit to the memory;
   a display control circuit connected between a screen and the first bus; and
   a microprocessor connected by a second bus to the decoder control circuit and the display control circuit.

5. A method for prioritizing MPEG images to be decoded by a single MPEG decoder, the method comprising:
   receiving first and second image sequences of coded images from more than one MPEG stream, each coded image having a frame interlaced image type or an interlaced half-image image type;
   receiving a stream of decoding commands in a series of synchronizing periods, each decoding command corresponding to a respective one of the coded images;
   adding each decoding command to a priority list;
   prioritizing the decoding commands by assigning to each decoding command a priority level based on the image type of the coded image corresponding to the decoding command and the period in which the decoding command was received;
   decoding the coded images in a priority order based on the priorities assigned to the coded images, thereby producing first and second images sequences of decoded images; and
   displaying the first and second image sequences.

6. The method according to claim 5 wherein prioritizing the decoding commands comprises:
   assigning a higher priority to a first decoding command corresponding to a frame interlaced coded image than to a second decoding command corresponding to a interlaced half-image coded image if the second decoding command has been on the list for less than one synchronizing period and otherwise assigning a higher priority to the second decoding command than to the first decoding command.

7. The method of claim 5 wherein prioritizing the decoding commands includes:
   assigning a first priority level to a first decoding command received during a preceding synchronization period and corresponding to a frame interlaced coded image type;
   assigning a second priority level, lower than the first priority level, to a second decoding command corresponding to an interlaced half-image coded image type; and
   assigning a third priority level, lower than the second priority level, to a third decoding command received during a current synchronization period and corresponding to the frame interlaced coded image type.

8. A method for decoding a plurality of MPEG sequences from more than one MPEG stream simultaneously using a single MPEG decoder, the method comprising:
   receiving a first sequence of frame-interlaced coded images and a second sequence of non-frame-interlaced coded images;

receiving a stream of decoding commands, each decoding command corresponding to a respective one of the coded images;

prioritizing the received coded images based on whether the coded image is a frame-interlaced coded image and on when the corresponding decoding command was received;

decoding the coded images using the single MPEG decoder based on the prioritizing, thereby producing decoded images of first and second images sequences; and saving the decoded images, wherein prioritizing the coded images includes:

assigning a first priority level to a first decoding command received during a preceding synchronization period and corresponding to the first sequence of frame-interlaced coded images;

assigning a second priority level, lower than the first priority level, to a second decoding command corresponding to the second sequence of non-frame-interlaced coded images; and assigning a third priority level, lower than the second priority level, to a third decoding command received during a current synchronization period and corresponding to the first sequence of frame-interlaced coded images.

9. The method according to claim 8 wherein the decoding commands are received in a series of synchronizing periods and prioritizing the coded images includes, during each synchronizing period, prioritizing the decoding commands received in the synchronizing period.

10. The method according to claim 9 wherein prioritizing the coded images includes, during each synchronizing period, assigning a lower priority to the decoding command received during the synchronizing period than to any decoding command received in a prior synchronizing period.

11. The method according to claim 9 wherein the coded images of the first sequence are decoded during the synchronizing period in which the decoding commands corresponding to the coded images of the first sequence are received and the coded images of the second sequence are decoded during a synchronizing period subsequent to the synchronizing period in which the decoding commands corresponding to the coded images of the second sequence are received.

12. The method according to claim 9 wherein prioritizing the coded images includes:

assigning a higher priority to a first coded image than to a second coded image if the decoding command corresponding to the first coded image was received in a synchronizing period prior to the synchronizing period in which the decoding command corresponding to the second coded image was received.

13. The method according to claim 12, wherein the second sequence comprises a sequence of non-interlaced complete images.

14. The method according to claim 12, wherein the second sequence comprises a sequence of interlaced half-images.

15. The method according to claim 8 wherein the coded images are read from a memory device and the decoded images are saved to the memory device.

16. The method of claim 8 wherein the first decoded image sequence is a decoded image sequence from a first MPEG stream and the second decoded image sequence is a decoded image sequence a second MPEG stream.

17. A device, comprising:

an MPEG decoder configured to decode a plurality of MPEG image sequences from more than one MPEG stream in parallel; and a controller coupled to the MPEG decoder and configured to control the MPEG decoder such that:

a received frame-interlaced image sequence is decodable during two periods following an associated decoding order; and a received non-frame-interlaced image sequence is decodable during a first period following an associated decoding order, wherein the controller comprises a prioritizing module configured to assign a first decoding priority to received frame-interlaced image sequences during a second period following their associated decoding order, a second decoding priority to received non-frame-interlaced image sequence and a third decoding priority to received frame-interlaced image sequence during a first period following their associated decoding order.

18. The device of claim 17, wherein the controller comprises a pointer memory to store images sequences to be decoded and associated decoding parameters and the controller assigns a decoding priority to received image sequences based at least in part on the associated decoding parameters.

19. The device of claim 17 wherein received image sequences of a first type are interlaced complete-image sequences and received image sequences of a second type are interlaced half-image sequences.

20. The device of claim 17 wherein the controller is further configured to control the MPEG decoder such that a first decoded image sequence of a coded image from a first MPEG stream is produced and a second decoded image sequence of a coded image from a second MPEG stream is produced.

21. The device of claim 17 wherein the first decoding priority is higher than the second decoding priority and the second decoding priority is higher than the third decoding priority.

* * * * *

UNITED STATES PATENT AND TRADEMARK OFFICE
CERTIFICATE OF CORRECTION

PATENT NO. : 7,369,614 B2
APPLICATION NO. : 09/770112
DATED : May 6, 2008
INVENTOR(S) : Jean-Michel Moutin It is certified that error appears in the above-identified patent and that said Letters Patent is hereby corrected as shown below:

Column 8
Line 35, "producing first and second images sequences" should read as -- producing first and second image sequences --

Column 9
Line 10, "decoded images of first and second images sequences" should read as -- decoded images of first and second image sequences --

Column 10
Line 10, "decoded image sequence a second MPEG stream" should read as -- decoded image sequence from a second MPEG stream --

Column 10
Lines 29-31, "priority to received non-frame-interlaced image sequence and a third decoding priority to received frame-interlaced image sequence during a first" should read as -- priority to received non-frame-interlaced image sequences and a third decoding priority to received frame-interlaced image sequences during a first --

Column 10
Line 34, "a pointer memory to store images sequences" should read as -- a pointer memory to store image sequences --

Signed and Sealed this

Fourteenth Day of October, 2008

JON W. DUDAS
*Director of the United States Patent and Trademark Office*